United States Patent
Matsushima et al.

(10) Patent No.: US 12,090,486 B2
(45) Date of Patent: Sep. 17, 2024

(54) PADDY DISCRIMINATOR

(71) Applicant: SATAKE CORPORATION, Tokyo (JP)

(72) Inventors: Hideaki Matsushima, Tokyo (JP); Hiroki Ishizuki, Tokyo (JP); Kazuya Uchiyama, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 228 days.

(21) Appl. No.: 17/631,108

(22) PCT Filed: Jul. 20, 2020

(86) PCT No.: PCT/JP2020/028162
§ 371 (c)(1),
(2) Date: Jan. 28, 2022

(87) PCT Pub. No.: WO2021/020219
PCT Pub. Date: Feb. 4, 2021

(65) Prior Publication Data
US 2022/0212197 A1   Jul. 7, 2022

(30) Foreign Application Priority Data

Jul. 30, 2019  (JP) .................................. 2019-140257

(51) Int. Cl.
*B02B 5/02* (2006.01)
*B02B 7/00* (2006.01)
*G01N 21/85* (2006.01)

(52) U.S. Cl.
CPC ................. *B02B 5/02* (2013.01); *B02B 7/00* (2013.01); *G01N 21/85* (2013.01); *G01N 2021/8592* (2013.01)

(58) Field of Classification Search
CPC .. B02B 5/02; B02B 7/00; B02B 3/045; G01N 21/85; G01N 2021/8592;
(Continued)

(56) References Cited

U.S. PATENT DOCUMENTS 5,314,072 A * 5/1994 Frankel ................... B07C 5/365
209/580
5,699,724 A * 12/1997 Wettstein ............... B07C 5/3425
99/600
(Continued)

FOREIGN PATENT DOCUMENTS

CN          103934223 A      7/2014
CN          104203436 B      5/2016
(Continued)

OTHER PUBLICATIONS

Chinese Office Action issued Feb. 15, 2023 in Application No. 2020800556976, with English-language translation.

*Primary Examiner* — Tarifur R Chowdhury
*Assistant Examiner* — Kemaya Nguyen
(74) *Attorney, Agent, or Firm* — Faegre Drinker Biddle & Reath LLP

(57) ABSTRACT

A paddy discriminator includes a downflow gutter in which mixed grains including paddy and brown rice are aligned and flow down, a light emission source that irradiates the mixed grains discharged from the downflow gutter with light, and light receiving means capable of receiving reflected light and transmitted light from the mixed grains irradiated with light by the light emission source, wherein the light emission source includes first illumination means that is provided on a light receiving means side of the mixed grains and is capable of irradiating the mixed grains with light of a red component, and second illumination means that is provided on a side away from the light receiving (Continued)

means of the mixed grains and is capable of irradiating the mixed grains with light of a green component.

4 Claims, 7 Drawing Sheets

(58) Field of Classification Search
CPC .......... B07C 2501/0018; B07C 5/3425; B07C 5/3416; B07C 5/02; B07C 5/362; Y02P 60/00; Y02P 60/14
See application file for complete search history.

(56) References Cited

U.S. PATENT DOCUMENTS

| 10,578,557 B2* | 3/2020 | Ishizuki ............. G01N 21/8851 |
| 2008/0121571 A1 | 5/2008 | Cohn et al. |
| 2015/0076042 A1 | 3/2015 | Miyamoto et al. |

FOREIGN PATENT DOCUMENTS

| CN | 106053342 A | | 10/2016 |
| JP | S59-186679 A | | 10/1984 |
| JP | S60-190243 A | | 9/1985 |
| JP | 2710954 B2 | * | 7/1988 |
| JP | H02-019747 A | | 1/1990 |
| JP | H02-219747 A | | 9/1990 |
| JP | 2001-356051 A | | 12/2001 |
| JP | 2002202265 A | * | 7/2002 |
| JP | 2004-290743 A | | 10/2004 |
| JP | 2006-198539 A | | 8/2006 |
| JP | 2007-117925 A | | 5/2007 |
| JP | 2011-104470 A | | 6/2011 |
| JP | 2015071135 A | * | 4/2015 |
| TW | I603789 B | | 11/2017 |

* cited by examiner

ROLL TYPE

CENTRIFUGAL HUSKING TYPE

PADDY DISCRIMINATOR

CROSS REFERENCE TO RELATED APPLICATIONS

This application is a National Stage of International Application No. PCT/JP2020/028162, filed Jul. 20, 2020, and claims the benefit of Japanese Patent Application No. 2019-140257, filed Jul. 30, 2019, the entire contents of each of which are incorporated herein by reference.

TECHNICAL FIELD

The present invention relates to a paddy discriminator that can discriminate paddy and brown rice from mixed grains composed of paddy and brown rice.

BACKGROUND ART

Conventionally, there has been known a roll type huller that rotates a pair of rubber rolls in opposite directions with different peripheral velocities, supplies paddy to a gap between the rubber rolls, shears and breaks the rice husks to hull the paddy due to the difference in peripheral velocity between the rolls. Although suffered from a lower husking ratio than an impact type huller (centrifugal husker), this roll-type huller is highly practical and has as large market share because it has a higher amount of brown rice hulled per hour (rice hulling capacity) than the impact type rice huller.

Ideally, the roll type huller husks 100% of paddy by passing the paddy between a pair of husking rolls once. However, the husking ratio may in some cases be around 85 to 95% due to mensurable factors such as roll diameters, width, combination of rolls of the same diameter and different diameters, roll rotation speed per minute, peripheral velocity, peripheral velocity difference rate, peripheral velocity difference length, and pressure between rubber rolls.

Therefore, various types of sorting sections are attached to the roll type huller section, and devised so that 100% husked brown rice is discharged outside the machine (that is, paddy is not discharged outside the machine). For example, there is known a huller sorter (for example, see Patent Literature 1) that has a swing sorting section that sorts the hulled rice passing through a huller section into brown rice, paddy and mixed grains attached to the huller section made up of a pair of husking rolls, and can husk the paddy extracted from the swing sorting section again and discharge only brown rice with good quality to outside the machine. Furthermore, there is known a huller sorter (for example, see Patent Literature 2) that has a paddy sorting section by color sorting attached to a paddy huller section made up of a pair of husking rolls, and can husk the paddy extracted by the paddy sorting section again and discharge only brown rice with good quality to outside the machine.

Patent Literature 1 describes the operation and effect that by installing a suspension tank at a low position of the machine body, the overall height of the machine cab be lowered and stable and reliable hulling work can be carried out. Further, Patent literature 2 indicates that by attaching the paddy sorting section by color sorting instead of the swing sorting section as in Patent Literature 1, complicated assembly and angle adjustment work like the swing sorting section are not required, and the problems of vibration and noise can be excluded. Furthermore, Patent Literature 2 describes the operation and effect that the entire device can be made as compact as possible, and automated.

CITATION LIST

Patent Literature

[Patent Literature 1] Japanese Patent Laid-Open No. S59-186679
[Patent Literature 2] Japanese Patent Laid-Open No. S60-190243
[Patent Literature 3] Japanese Patent Laid-Open No. H02-019747

SUMMARY OF INVENTION

Technical Problem

However, in the huller sorter including the swing sorting section as in Patent Literature 1, a large number of recessed portions are formed in a rectangular sorting board, the sorting board is tilted and swung, and brown rice having a shorter length than paddy is caused to enter the recessed portions by shape sorting and specific gravity sorting to transfer the brown rice upward of the sorting board. On the other hand, the paddy that does not enter the recessed portions is transferred downward of the sorting board to be segregated, whereby sorting is performed. Accordingly, if the paddy having the same length as the brown rice enters the recessed portions, the brown rice and paddy are unlikely to be sorted.

On the other hand, in the huller sorter including the paddy sorting section by color sorting as in Patent Literature 2, the mechanism of the color sorting section includes a light source, a light receiving element, an injection nozzle, and a control circuit that operates the injection nozzle based on a change signal of a light amount detected by the light receiving element. Brown rice and paddy are discriminated based on a signal by a monochronic sensor (difference in shade of a single color such as white and black) like a change in light amount, and therefore the color sorting section may in some cases confuse brown rice with paddy.

Note that there is also well-known a device (referred to as a "husking ratio sensor") that detects a ratio (referred to as "husking ratio") of brown rice in the mixed grains of the brown rice and paddy after husked.

The husking ratio sensor described in Patent Literature 3 is a husking ratio sensor having a strobe photophore and color image pickup means placed in a chute in which mixed grains flow down, and the color image pickup means picks up an image synchronously with intermittent light emission of the strobe photophore. Three color signals of a red signal (R), a green signal (G) and a blue signal (B) are separated from image information picked up by the color image pickup means, and a ratio of these color components is calculated. Furthermore, a husking ratio is calculated by a predetermined calculation from the calculated ratio of the color components. Thereby, it is possible to increase an information amount, and perform accurate discrimination by using discrimination of a ratio of the three color components.

However, the husking ratio sensor described in Patent Literature 3 causes a strobe photophore to flash as the light source, so that the husking ratio sensor can acquire only the information amount at the time of flashing, and has a small information amount. Accordingly, discrimination and sorting accuracy may be low. Further, since the reflected light at the time of irradiating the mixed grains with the light from the strobe photophore is acquired by the color image pickup means, only the reflection components of light can be acquired, and depending on the flowing-down condition of the raw material, paddy or brown rice may be difficult to distinguish in some cases.

In the light of the above described problems, a technical problem to be solved by the present invention is to provide a paddy discriminator that acquires a reflection component and a transmission component of light received in light receiving means, and can accurately discriminate between paddy and brown rice.

Solution to Problem

The invention according to claim 1 of the present application is a paddy discriminator including a downflow gutter in which mixed grains including paddy and brown rice are aligned and flow down, a light emission source that irradiates the mixed grains discharged from the downflow gutter with light, and light receiving means capable of receiving reflected light and transmitted light from the mixed grains irradiated with light by the light emission source, wherein the light emission source includes first illumination means that is provided on a light receiving means side of the mixed grains and is capable of irradiating the mixed grains with light of a red component, and second illumination means that is provided on a side away from the light receiving means of the mixed grains and is capable of irradiating the mixed grains with light of a green component.

The invention according to claim 2 of the present application is the paddy discriminator according to claim 1, wherein as a light receiving result of the light receiving means, when a light reception amount of the light of the green component is larger than a predetermined green component threshold, the mixed grains that are discharged are discriminated as brown rice, and when a light reception amount of the light of the green component is smaller than the predetermined green component threshold, and a light reception amount of the light of the red component is larger than a predetermined red component threshold, the mixed grains that are discharged are discriminated as paddy.

The invention according to claim 3 of the present application is the paddy discriminator according to claim 1 or 2, wherein the light emission source further comprises third illumination means that is provided at a position on an extension line connecting the light receiving means and the mixed grains and is capable of irradiating a background of the mixed grains with light of a blue component, and as the light receiving result of the light receiving means, when a light reception amount of the light of the blue component is out of a predetermined range, what is discharged from the downflow gutter is discriminated as foreign matter that is not the mixed grains.

The invention according to claim 4 of the present application is the paddy discriminator according to any one of claims 1 to 3, wherein the downflow gutter is provided to extend to at least an observation region of the light receiving means in which the mixed grains are irradiated with light, and is capable of transmitting light from the light emission source.

The invention is the paddy discriminator, wherein the paddy discriminator is mounted on a huller sorter, and performs notification prompting adjustment of a husker, according to a husking ratio calculated based on the light receiving result of the light receiving means.

Advantageous Effect of Invention

According to the invention according to claim 1, it is possible to enhance accuracy of discrimination of paddy and brown rice greatly as compared with the conventional art, by installing the first illumination means capable of irradiating the mixed grains of paddy and brown rice with the light of the red component, and the second illumination means capable of irradiating the mixed grains with the light of the green component, and receiving reflected light and transmitted light of each light by the light receiving means, based on the knowledge that paddy has poor transmission of the light of the green component, and higher reflectivity of the light of the red component, which is obtained in the verification experiment of the present invention.

According to the invention according to claim 2, when the light reception amount of the light of the green component in the light receiving means is higher than the predetermined green component threshold, the discharged mixed grains are discriminated as brown rice, and when the light reception amount of the light of the green component is lower than the above described predetermined green component threshold, and the light reception amount of the light of the red component is higher than the predetermined red component threshold, the mixed grains discharged from the downflow gutter are discriminated as paddy, so that it is possible to discriminate the kinds of the mixed grains quickly without performing complicated discrimination processing.

According to the invention according to claim 3, by including the third illumination means capable of irradiating the background with the light of the blue component, at the position on the extension line connecting the light receiving means and the mixed grains, it becomes possible to determine quickly that foreign matter other than the mixed grains is discharged from the downflow gutter, when a light reception amount of the light of the blue component is out of a the predetermined range.

According to the invention according to claim 4, by providing the downflow gutter extensively to the observation region of the light receiving means, and forming the downflow gutter of a transparent material such as glass, air resistance hardly occurs to the grains of the mixed grains, and the postures of the grains are stabilized, as compared with the case in which the mixed grains are discharged from the downflow gutter lower end as in the conventional art, so that it is possible to enhance the discrimination accuracy of the mixed grains.

According to the invention, the paddy discriminator of the present invention is mounted on a huller sorter, and thereby it becomes possible to perform notification prompting adjustment of the husker properly to the administrator and the operator of the device, according to the husking ratio based on the discrimination result of the mixed grains by the light receiving means.

DESCRIPTION OF EMBODIMENTS

Figure 1:
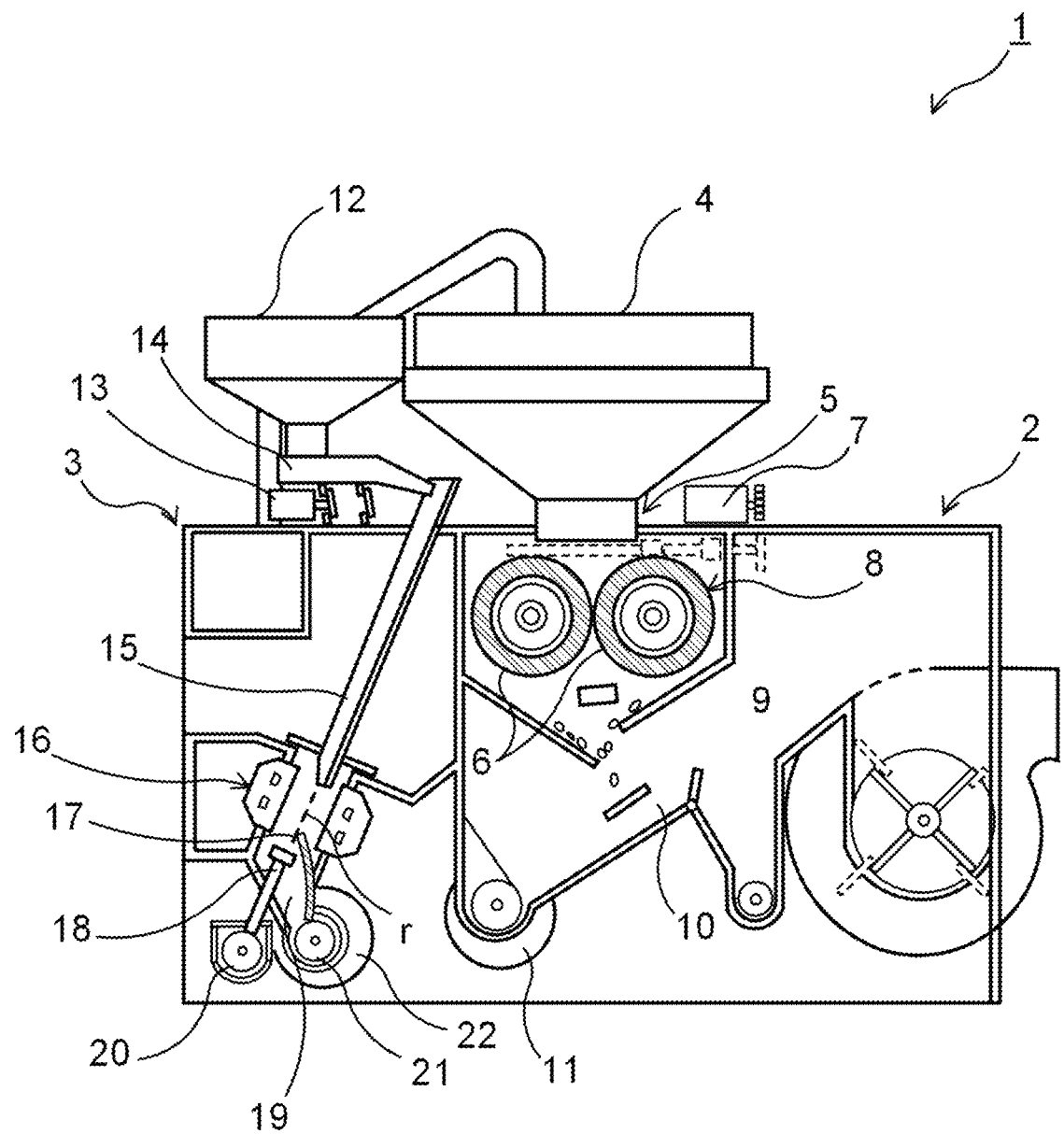
FIG. 1 is a schematic sectional view showing one embodiment of a huller sorter to which a paddy sorter of the present invention is applied.

FIG. 1 is a schematic sectional view of a huller sorter to which a paddy sorter of the present invention is applied. In a huller sorter 1, a main part is composed of a huller section 2 that removes husks (chaff) from paddy to make paddy brown rice, and a paddy sorting section 3 (paddy sorter 3) that is attached to the huller section 2 and can sort and remove only paddy from mixed grains made up of paddy and brown rice that are generated in the huller section 2.

The above described huller section 2 includes a supply section 5 made up of a raw material hopper 4, a roll section 8 made up of a pair of husking rolls 6 disposed at a lower part of the supply section 5 and a roll gap device 7, a wind sorting section 10 in which a sorting wind passage 9 at a lower part of the roll section 8 is disposed to perform wind sorting, and a mixed grain elevating section 11 that transfers mixed grains of paddy and brown rice that are sorted by wind in the wind sorting section 10 to the paddy sorting section 3.

The above described paddy sorting section 3 includes a vibration supply mechanism including a mixed grain hopper 12, a vibration device 13, and a vibration trough 14 that are located on a machine body upper part, and a downflow supply mechanism composed of an inclined downflow gutter 15. Further, the above described paddy sorting section 3 includes an optical inspection section 16 (corresponding to the "paddy discriminator" of the present invention) disposed to face a fall trajectory (a broken line portion "r" in FIG. 1) of mixed grains at a lower end of the above described downflow gutter 15, and an ejector section 17 that discriminates brown rice from paddy with respect to the mixed grains and excludes only paddy from the mixed grains, based on an inspection result of the optical inspection section 16, in a machine body lower part.

Under the above described ejector 17, a brown rice collection hopper 18 that collects brown rice under the fall trajectory of the mixed grains, and a paddy collection hopper 19 that collects paddy that is excluded from the fall trajectory of the mixed grains are provided. Furthermore, in the above described brown rice collection hopper 18, a brown rice discharge section 20 that includes a conveyance mechanism that discharges the brown rice to outside of the huller sorter 1 is provided, and in the paddy collection hopper 19, a paddy discharge section 21 including a conveyance mechanism that conveys paddy to husk the paddy again is provided. The paddy discharge section 21 may be provided with a grain lifter 22 that can return the paddy to the husking roll type huller section 2.

Figure 2:
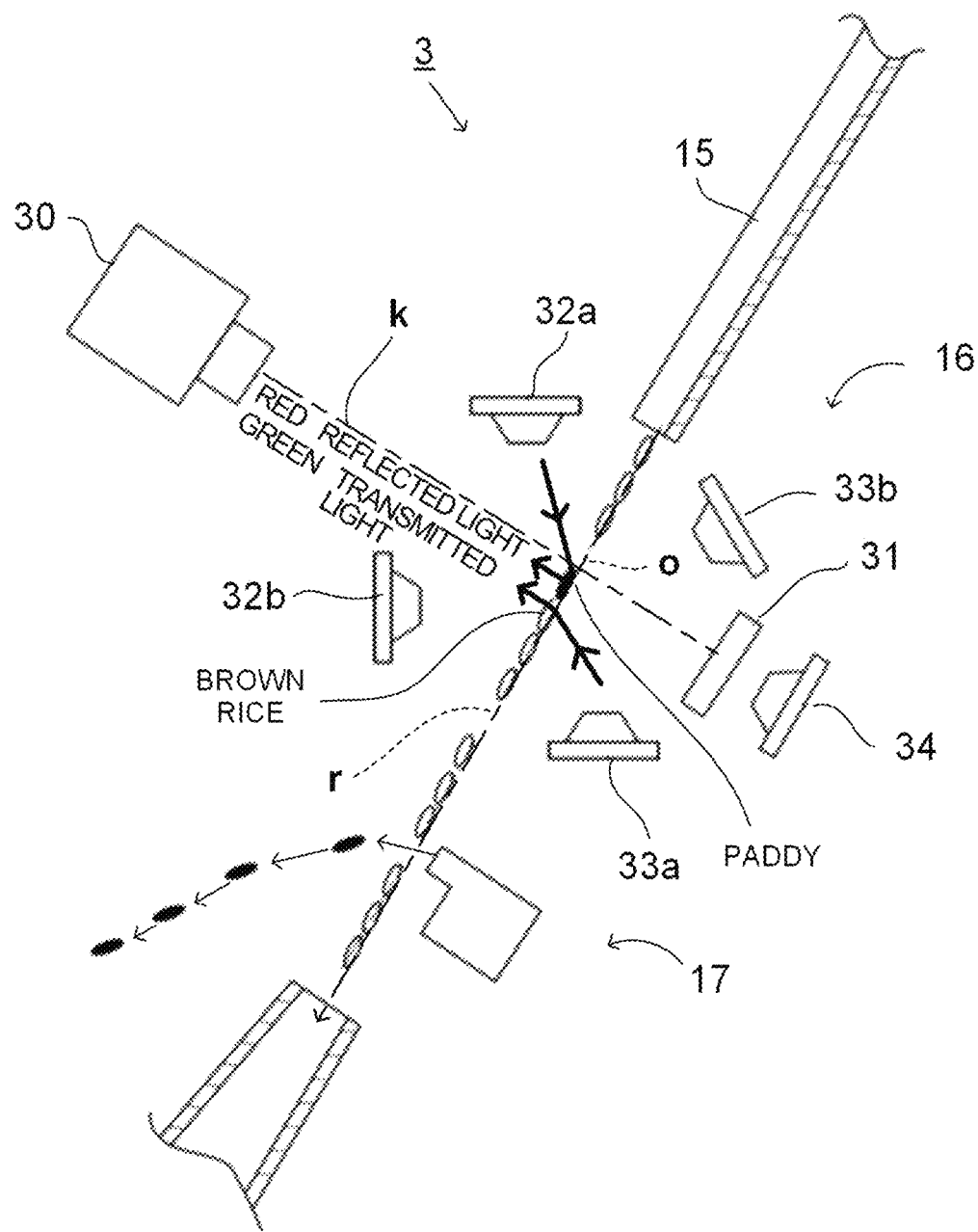
FIG. 2 is a schematic view showing one embodiment of the paddy sorter of the present invention.

FIG. 2 is a schematic view enlarging an internal structure of the paddy sorting section 3, in particular, the optical inspection section 16 and the ejector section 17. Hereinafter, a structure of the paddy sorting section 3 that is a main part of the present invention will be describe with reference to FIG. 2.

The paddy sorting section 3 is constituted mainly of the optical inspection section 16 disposed under the downflow gutter 15, and the ejector section 17 under the optical inspection section 16 as described above. In the optical inspection section 16, a full color camera 30 (light receiving means) is provided on one side (front side) facing the downflow trajectory "r" of the mixed grains made up of paddy and brown rice at a downstream side of the downflow gutter 15. Ahead of a place where an optical axis k of the full color camera 30 is across the downflow trajectory "r", a background 31 is provided.

The optical inspection section 16 is provided with first illumination means 32a and 32b that irradiates mixed grains with light on a side closer to the full color camera 30 than the downflow trajectory "r" of the mixed grains, and second illumination means 33a and 33b that irradiates the mixed grains with light on a side more away from the full color camera 30 than the downflow trajectory "r" of the mixed grains, and third illumination means 34 that irradiates a back surface of the above described background 31. Note that an intersection point of the downflow trajectory "r" and the optical axis "k" is an observation region "o" by the full color camera 30.

The above described first illumination means 32a and 32b, second illumination means 33a and 33b and third illumination means 34 each has a light emission source of a single color, and in the present embodiment, as the most preferable example, light sources made up of red LED elements are adopted in the first illumination means 32a and 32b, light sources made up of green LED elements are adopted in the second illumination means 33a and 33b, and the light source made up of blue LED elements is adopted in the third illumination means 34. Note that as the LED elements to be used, it is also possible to use RGB LED elements other than the LED elements of the single colors.

Explaining in more detail, when the mixed grains that are objects to be sorted are irradiated with light of a red component from the first illumination means 32a and 32b, reflected light thereof is to be received by the light receiving element for the red component of the full color camera 30. When the second illumination means 33a and 33b irradiates the mixed grains that are the objects to be sorted with light of a green component, transmitted light thereof is to be received by the light receiving element for a green component of the full color camera 30. Further, when the third illumination means 34 irradiates the background 31 with light of a blue component, whether or not the object to be sorted passes through the observation region "o", and whether or not foreign matter other than the mixed grains that are the objects to be sorted passes are to be discriminated by a light reception amount of the blue component of the full color camera 30.

Figure 3A:
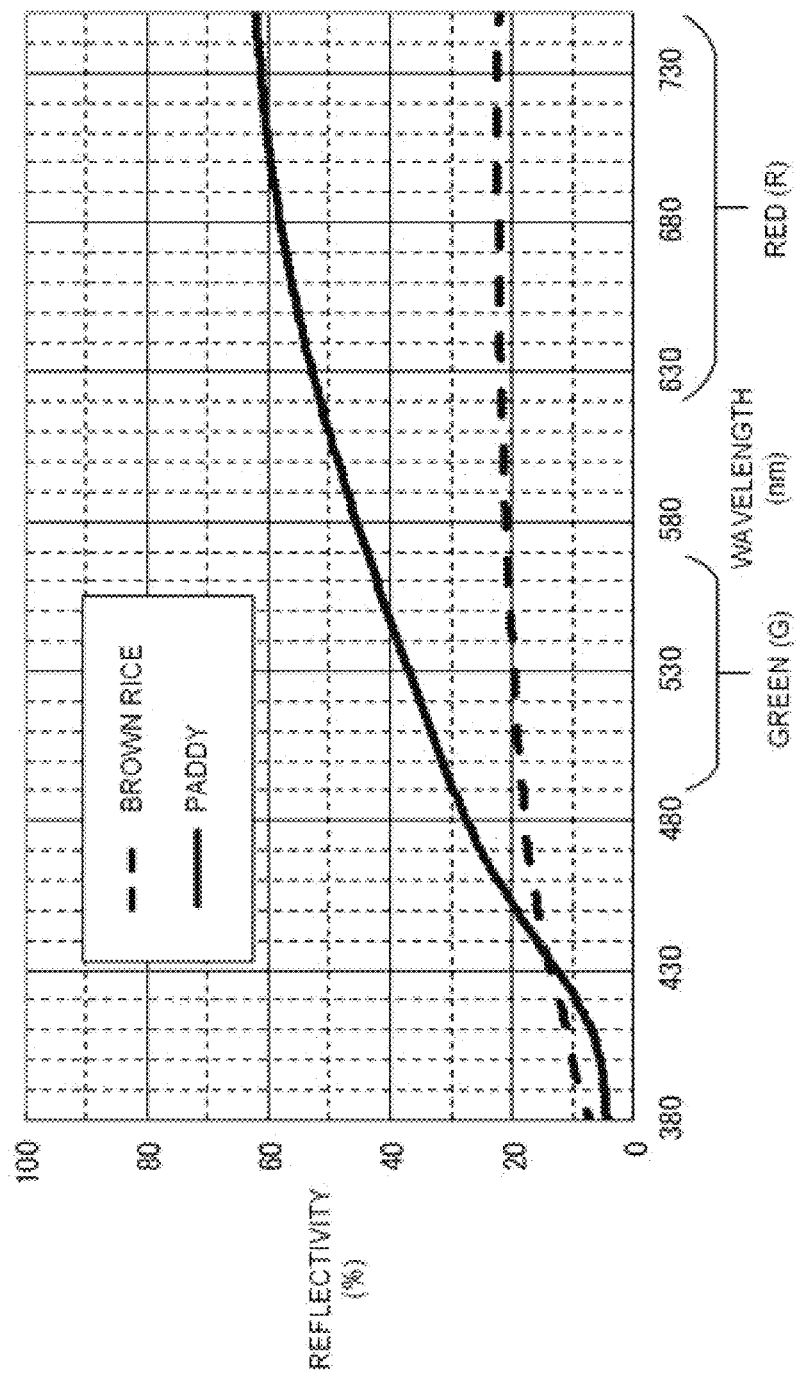
FIG. 3A is a graph showing a relationship of light reflectance and light wavelengths of paddy and brown rice in the paddy sorter of the present invention.
Figure 3B:
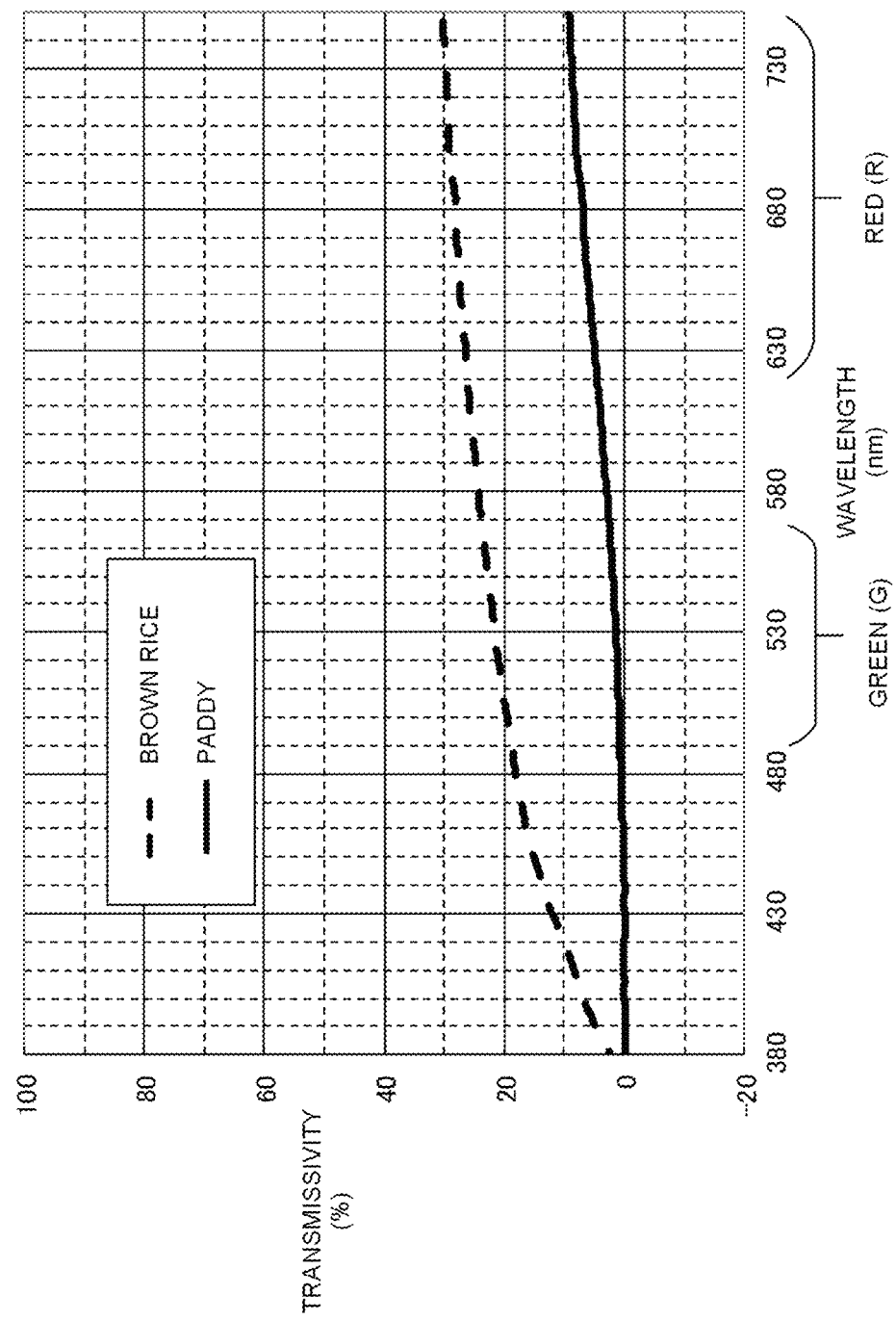
FIG. 3B is a graph showing a relationship of light transmittance and light wavelengths of paddy and brown rice in the paddy sorter of the present invention.

Note that the above described preferable embodiment is supported by the following reason. In other words, based on the result of the verification experiment of the present invention, FIG. 3A shows relationships between light wavelengths and reflectance in brown rice and paddy in a graph, whereas FIG. 3B shows relationships between light wavelengths and transmittance in a graph, and in both brown rice and paddy that are objects to be sorted, the light transmittance thereof do not have a large difference between the green color and red color.

On the other hand, when the light reflectance are seen, it is found that a difference in reflectance in the brown rice and paddy is larger in red than in green. Accordingly, the light sources made up of red LED elements are preferably adopted in the first illumination means 32a and 32b with an objective of causing the full color camera 30 to receive the reflected light, based on the optical characteristics as described above, and it becomes possible to discriminate kinds of the mixed grains that are objects to be sorted more accurately.

Further, if a white light source like a fluorescent light is used in each of the above described first illumination means 32a and 32b, the second illumination means 33a and 33b and the third illumination means 34, information in which both components of the reflected light and transmitted light are combined is taken into the full color camera 30, so that the characteristic light reception amount becomes difficult to detect and discrimination accuracy is likely to be reduced.

Note that in the present embodiment, as a preferable example, the first illumination means 32a and 32b is set to be red, the second illumination means 33a and 33b is set to be green, and the third illumination means 34 is set to be blue, but a combination of the colors is not necessarily limited to this, and combinations in Table 1 below are also possible.

TABLE 1

| first illumination means | second illumination means | third illumination means |
| --- | --- | --- |
| green | red | blue |
| green | blue | red |
| blue | green | red |
| red | blue | green |
| blue | red | green |

Next, a method for discriminating paddy and brown rice in the aforementioned paddy sorting section 3 will be described. As described above, by using the light sources of the single colors in the respective first illumination means 32a and 32b, second illumination means 33a and 33b and the third illumination means 34, as the first illumination means 32a and 32b, the second illumination means 33a and 33b and the third illumination means 34, it becomes possible to discriminate paddy from brown rice more accurately, and further it becomes possible to discriminate foreign matters other than paddy or brown rice.

In other words, when brown rice passes through the observation region "o", brown rice optically has better transmissivity and lower reflectivity as compared with paddy as shown in FIG. 3A and FIG. 3B, so that the light reception amount of the light receiving element for the red component (reflection component) of the full color camera 30 is low, and a light reception amount of the light receiving element for the green component (transmission component) of the full color camera 30 becomes high.

On the other hand, paddy optically has lower transmissivity, and higher reflectivity as compared with brown rice, so that when the paddy passes through the observation region "o", a light reception amount of the light receiving element for the red component (reflection component) of the full color camera 30 is high, and a light reception amount of the light receiving element of the green component (transmission component) of the full color camera 30 becomes low. Note that a light reception amount of a blue component of the full color camera 30 has a substantially constant value since there is not a large difference in amount between brown rice and paddy. This is shown in Table 2.

TABLE 2

| RGB component | passage of paddy | passage of brown rice |
| --- | --- | --- |
| R | display high light reception amount | display low light reception amount |
| G | display low light reception amount | display high light reception amount |
| B | display light reception amount of fixed value | display light reception amount of fixed value |

Figure 4:
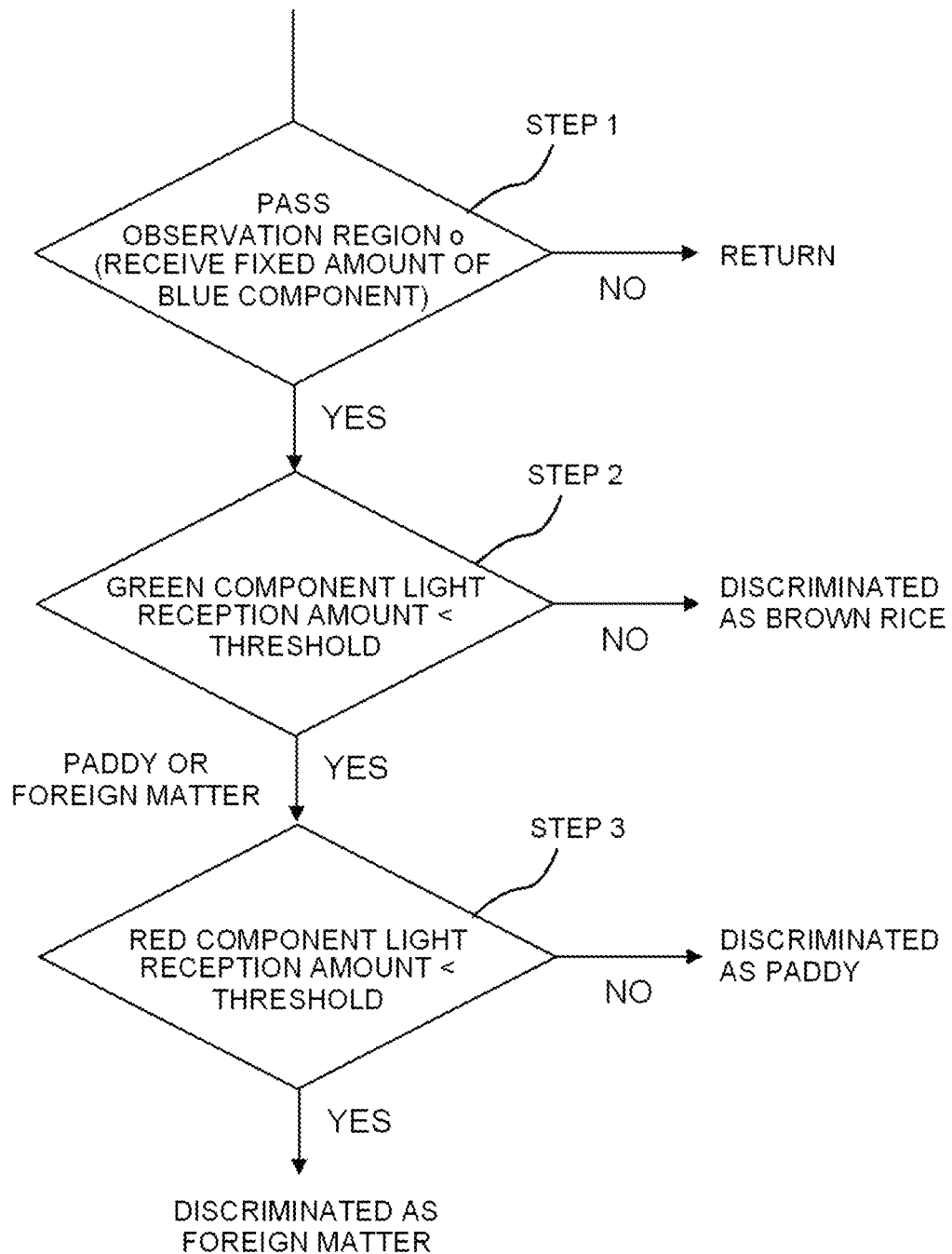
FIG. 4 is a flow explaining one embodiment of a discrimination method for discriminating between paddy and brown rice in the paddy sorter of the present invention.

FIG. 4 is a flow for executing the aforementioned discrimination method. In step 1, whether or not the mixed grains pass through the observation region "o" is discriminated based on the light reception amount of the blue component in the full color camera 30. In step 2, whether or not the light reception amount of the green component in the full color camera 30 is higher or lower than a predetermined green component threshold is confirmed, and thereby whether brown rice having high transmissivity passes, or whether paddy or foreign matter other than the brown rice passes is discriminated. Subsequently, in step 3, whether the light reception amount of the red component in the full color camera 30 is higher or lower than a predetermined red component threshold is confirmed, and thereby whether paddy passes or foreign matter other than paddy passes is discriminated.

Note that in step 2 and step 3 described above, it may be configured so that a ratio of the light reception amount of the red component that is the reflection component, and the light reception amount of the green component that is the transmission component (for example, a value of "reflection component/transmission component") is calculated, and the grain having the value larger than the predetermined threshold is determined as paddy, whereas the grain having the value smaller than the predetermined threshold is discriminated as brown rice.

Other Embodiments

Although one embodiment of the paddy discriminator of the present invention is described above, various modifications are possible. For example, in the aforementioned embodiment, the full color camera 30 including the light receiving elements of the respective colors is used as the light receiving means, but the light receiving means is not necessarily limited to the device like this, but it is possible to use light reception sensors for single color corresponding to red, green and blue respectively. Further, as the light receiving means, an image pickup camera can also be used, and in that case, respective color components of a red component, a green component and a blue component can be extracted by performing analysis processing of an image that is picked up.

In the above described embodiment, the mode in which the paddy discriminator of the present invention is applied to the paddy sorter 3, further, to the huller sorter 1 is described, but it is also possible to apply the paddy discriminator to an inspection device for mixed grains.

Figure 5:
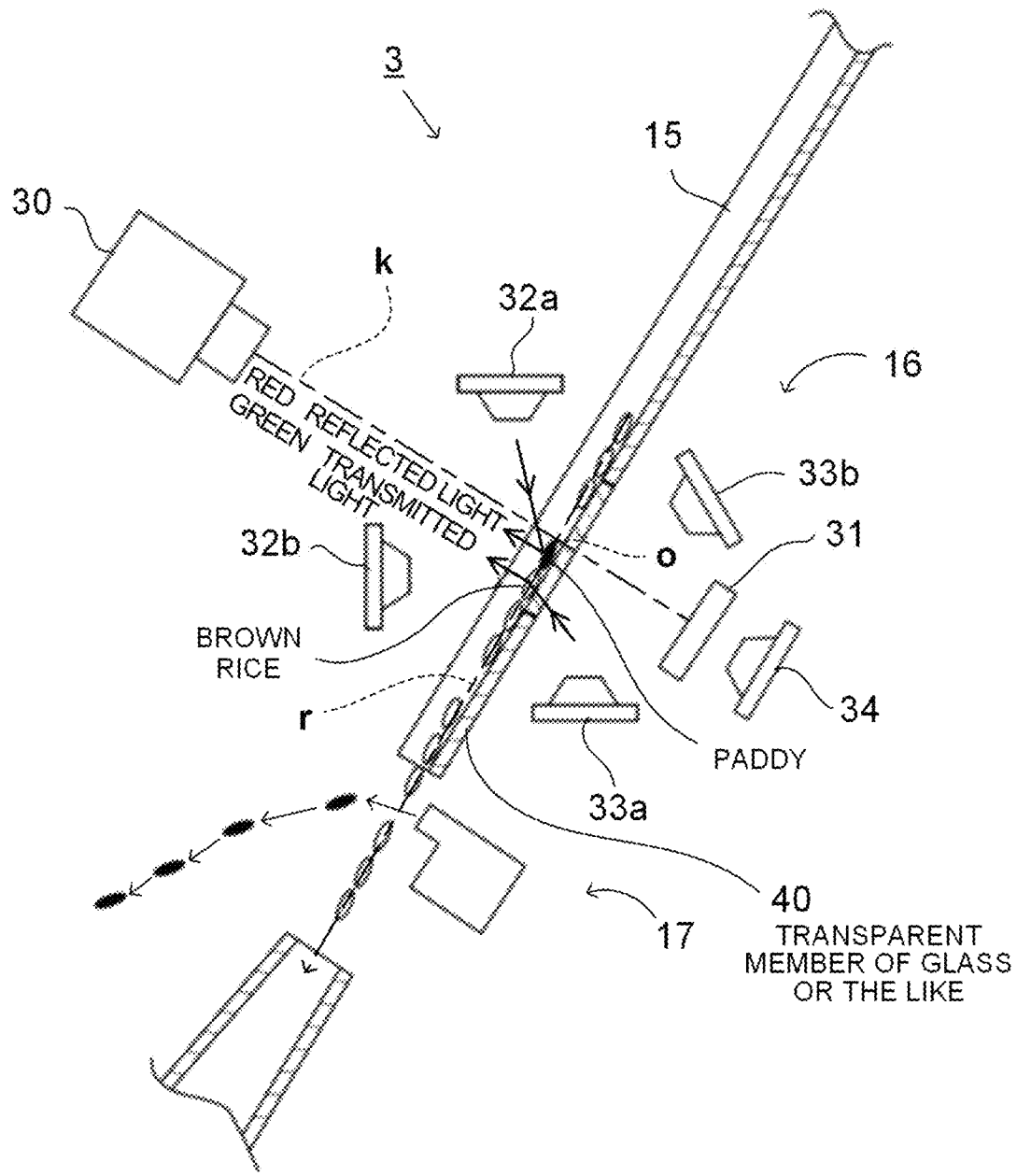
FIG. 5 is a schematic view showing another embodiment of a downflow gutter in the paddy sorter of the present invention.

FIG. 5 is a schematic view showing another embodiment of the paddy sorter of the present invention, a downflow gutter 15 is formed into a long shape, and a transparent member 40 of glass or the like is provided in a part of a bottom surface in a vicinity of the observation region "o". Thereby, as compared with the paddy sorter that discharges mixed grains from the lower end of the downflow gutter 15 and causes the mixed grains to flow down in a free fall state as in the conventional art, air resistance hardly occurs to grains of the mixed grains, and the postures of the grains are stabilized, so that it is possible to enhance discrimination accuracy of the mixed grains. Note that instead of providing the above described transparent member 40, a slit-shaped space may be provided, and further, the downflow gutter 15 may be composed of a belt conveyor.

Figure 6:
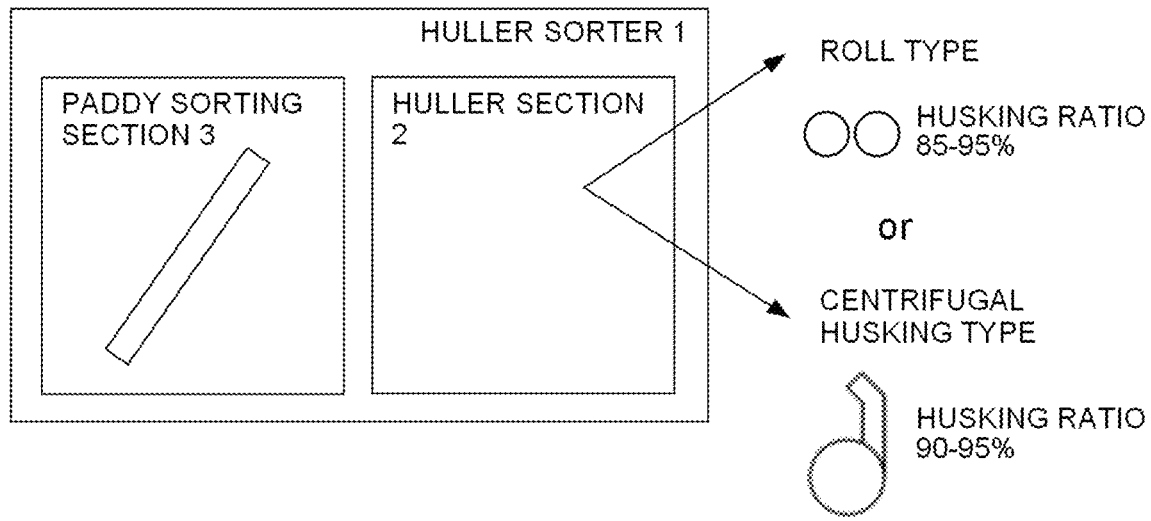
FIG. 6 is a schematic diagram showing another embodiment of a huller sorter to which the paddy sorter of the present invention is applied.
Figure 6:
Figure 6:
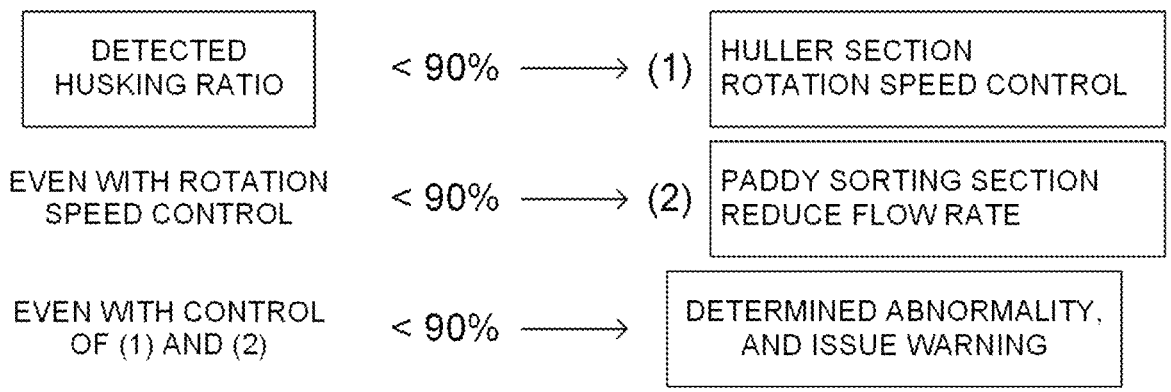

FIG. 6 is a schematic diagram showing another embodiment of the huller sorter 1 to which the paddy sorter 3 of the present invention is applied. The huller sorter 1 shown in FIG. 6 can adopt a centrifugal type (impeller type) husker instead of a roll type husker, as the huller section 2. Further, as the paddy sorter 3, a belt type can be adopted instead of a chute type (type using the downflow gutter 15 of the present embodiment).

When the roll type husker is adopted, if the husking ratio obtained from the discrimination result of the full color camera 30 of the paddy sorter 3 is 85% or lower, (1) a roll gap adjustment device of the roll type husker is controlled to perform control so that the husking ratio becomes close to the standard husking ratio of 85 to 95%. When the husking ratio does not reach the above described standard husking ratio even after a fixed time elapses after the roll gap control is carried out, (2) there is a risk of a flow rate of the paddy sorter 3 being excessive, so that control of reducing the flow rate is performed this time. When the husking ratio does not reach the above described standard husking ratio even after passing through (1) and (2), an abnormality is determined, and waring should be notified to an administrator or an operator of the device.

When the centrifugal type (impeller type) husker is adopted, if the husking ratio obtained from the discrimination result of the full color camera 30 of the paddy sorter 3 is 90% or lower, (1) a rotation speed of the centrifugal type husker is controlled to perform control so that the husking ratio is close to a standard husking ratio of 85 to 95%. When the husking ratio does not reach the above described standard husking ratio even after a fixed time elapses after the rotation speed control is carried out, (2) there is a risk of a flow rate of the paddy sorter 3 being excessive, so that control of reducing the flow rate is performed this time. When the husking ratio does not reach the above described standard husking ratio even after passing through (1) and (2), an abnormality is determined, and warning should be notified to an administrator or an operator of the device.

Although the several embodiments of the present invention are described thus far, the aforementioned embodiments of the invention are intended to facilitate understanding of the present invention, but not intended to limit the present invention. The present invention can be modified and improved, and equivalents of the present invention are included in the present invention, without departing from the scope of the present invention. Furthermore, within the range in which at least a part of the aforementioned problem can be solved, or a range in which at least a part of the effect is exhibited, combination or omission of the respective components described in the claims and description are possible.

REFERENCE SIGNS LIST

1 Huller sorter
3 Paddy sorting section (paddy sorter)
15 Downflow gutter
16 Optical inspection section (paddy discriminator)
17 Ejector section
30 Full color camera (light receiving means)
31 Background
32a, 32b First illumination means
33a, 33b Second illumination means
34 Third illumination means

The invention claimed is:

1. A paddy discriminator, comprising:
a downflow gutter in which mixed grains including paddy and brown rice are aligned and flow down;
a light emission source that irradiates the mixed grains discharged from the downflow gutter with light; and
a light receiver that receives reflected light and transmitted light from the mixed grains irradiated with light by the light emission source,
wherein the light emission source comprises:
a first light source that is provided on a light receiver side of the mixed grains and that irradiates the mixed grains with light of a red component, and
a second light source that is provided on a side away from the light receiver of the mixed grains and that irradiates the mixed grains with light of a green component, and
wherein as a light receiving result of the light receiver,
when a light reception amount of the light of the green component is larger than a predetermined green component threshold, the mixed grains that are discharged are discriminated as brown rice, and
when a light reception amount of the light of the green component is smaller than the predetermined green component threshold, and a light reception amount of the light of the red component is larger than a predetermined red component threshold, the mixed grains that are discharged are discriminated as paddy.

2. The paddy discriminator according to claim 1,
wherein the light emission source further comprises a third light source that is provided at a position on an extension line connecting the light receiver and the mixed grains and that irradiates a background of the mixed grains with light of a blue component, and
as the light receiving result of the light receiver, when a light reception amount of the light of the blue component is out of a predetermined range, what is discharged from the downflow gutter is discriminated as foreign matter that is not the mixed grains.

3. The paddy discriminator according to claim 1,
wherein the downflow gutter is provided to extend to at least an observation region of the light receiver in which the mixed grains are irradiated with light, and is capable of transmitting light from the light emission source.

4. The paddy discriminator according to claim 1,
wherein the paddy discriminator is mounted on a huller sorter, and
performs notification prompting adjustment of a husker, according to a husking ratio calculated based on the light receiving result of the light receiver.

* * * * *